(12) United States Patent
O'Neil et al.

(10) Patent No.: US 7,596,573 B2
(45) Date of Patent: Sep. 29, 2009

(54) SYSTEM AND METHOD FOR AUTOMATIC DATA MAPPING

(75) Inventors: Owen O'Neil, Pleasanton, CA (US); Agnes Bardini, Pleasanton, CA (US); Kevin Loo, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 10/458,972

(22) Filed: Jun. 11, 2003

(65) Prior Publication Data

US 2007/0179939 A1 Aug. 2, 2007

(51) Int. Cl.
*G06F 17/30* (2006.01)
(52) U.S. Cl. ........................... 707/101; 100/102
(58) Field of Classification Search ............... 707/1–10, 707/100–104.1
See application file for complete search history.

(56) References Cited

U.S. PATENT DOCUMENTS

| | | | | |
|---|---|---|---|---|
| 5,937,409 A * | 8/1999 | Wetherbee | ............... | 707/103 R |
| 6,085,196 A * | 7/2000 | Motoyama et al. | .......... | 707/102 |
| 6,216,131 B1 * | 4/2001 | Liu et al. | ..................... | 707/102 |
| 6,292,803 B1 * | 9/2001 | Richardson et al. | ......... | 707/102 |
| 6,339,775 B1 * | 1/2002 | Zamanian et al. | ........... | 707/101 |
| 6,446,075 B1 * | 9/2002 | Velasco | ..................... | 707/102 |
| 6,560,608 B1 * | 5/2003 | Tomm et al. | ................. | 707/102 |
| 6,907,433 B2 * | 6/2005 | Wang et al. | ............... | 707/104.1 |
| 6,925,477 B1 * | 8/2005 | Champagne et al. | ........ | 707/203 |
| 2001/0014890 A1 * | 8/2001 | Liu et al. | ..................... | 707/102 |
| 2002/0055932 A1 * | 5/2002 | Wheeler et al. | .......... | 707/104.1 |
| 2004/0158567 A1 * | 8/2004 | Dettinger et al. | ............ | 707/100 |

* cited by examiner

*Primary Examiner*—Khanh B Pham
(74) *Attorney, Agent, or Firm*—Townsend and Townsend and Crew LLP

(57) ABSTRACT

A system and method for automatic data mapping of a source object to a target object. Field maps can be automatically determined from the source and target objects, database platform, ETL maps, user-defined and data conversion rules, default values, or other pre-defined parameters. Where a change occurs in the source or target data structure, the present invention ensures proper mapping between the source and target data structures occurs, thus reducing the burden of exception handling on the user and preventing oversight in correcting improper mapping. The present invention can also be used by a compiler to generate SQL steps during compile-time processes to design field maps that can be stored as an application class.

19 Claims, 9 Drawing Sheets

| Step | Input Value from Source | Source Field | Target Field | Comments |
|---|---|---|---|---|
| 1 | A.CATALOG_NBR, | A.CATALOG_NBR, | A.CATALOG_NBR, | AutoMapper-Step 1 Match Source to Target field |
| 1 | A.DATETIME_ADDED, | A.DATETIME_ADDED, | A.DATETIME_ADDED, | AutoMapper-Step 1 Match Source to Target field |
| 1 | A.INV_ITEM_ID, | A.INV_ITEM_ID, | A.INV_ITEM_ID, | AutoMapper-Step 1 Match Source to Target field |
| 1 | B.LASTUPDDTTM, | B.LASTUPDDTTM, | A.LASTUPDDTTM, | AutoMapper-Step 1 Match Source to Target field |
| 1 | A.MODEL_NBR, | A.MODEL_NBR, | A.MODEL_NBR, | AutoMapper-Step 1 Match Source to Target field |
| 2 | | | A.EFF_STATUS, | AutoMapper Step 2 Default from Rule Definition for Setting Default field values for the target field. |
| 2 | | | A.EFFDT, | AutoMapper Step 2 Default from Rule Definition for Setting Default field values for the target field. |
| 2 | PROD_COLOR | A.PROD_FIELD_C10_A | A.PROD_FIELD_C10_A, | AutoMapper Step 2-User defines rule to map translation set field value to the target field. |
| 2 | PROD_PRICE | | A.PROD_PRICE, | AutoMapper Step 2-User defines rule to apply transformation rule to edit field value of the target field. |
| 2 | PROD_SIZE | PROD_SIZE_TYP | A.PROD_SZ_ATTR1, | AutoMapper Step 2-User defines rule to map translation set field value to the target field. |
| 2 | A.PRODUCT, | | A.PRODUCT_ID, | AutoMapper Step 2-User defines rule to set field alias to map to the target field. |
| 2 | | | A.SETID, | AutoMapper Step 2 Default from Rule Definition for Setting Default field values for the target field |
| 2 | UOM | UOM | A.UNIT_OF_MEASURE, | AutoMapper Step 2-User defines rule to map translation set field value to the target field. |
| 3 | | | A.LAST_MAINT_OPRID | AutoMapper-Step 3 Default from PSRECFIELD |
| 4 | '' | | A.DESCR254, | AutoMapper Step 4-Apply platform alias for null field value. |
| 4 | '' | | A.PROD_BRAND, | AutoMapper Step 4-Apply platform alias for null field value. |
| 5 | A.PROD_NAME, | | A.DESCR, | Overridden by the user at the map level, truncated by AutoMapper where data type on source Char50 and target is Char30. |
| 5 | D.INSEAM, | | A.PROD_SZ_ATTR2, | Overridden by the user at the map level. |
| 5 | D.WAIST, | | A.PROD_SZ_ATTR3, | Overridden by the user at the map level. |
| 5 | D.SIZE | | A.PROD_SZ_ATTR4, | Overridden by the user at the map level. |
| 5 | A.PROD_FIELD_C30_A, | | A.PROD_CATEGORY, | Overridden by the user at the map level. |

FIG. 7

SYSTEM AND METHOD FOR AUTOMATIC DATA MAPPING

BACKGROUND OF THE INVENTION

1. Field of the Invention

The present invention relates generally to the field of software and more particularly to a system and method for automatic data mapping.

2. Background of the Invention

Computer programs or software can be used to accomplish various project requirements and organizational needs. Large enterprise software applications often require the use of large amounts of data and information, generally stored in and requested from databases or repositories. Used in conjunction with enterprise applications are database and database management systems which manage, maintain, and operate on varying quantities of data. Enterprise applications operating or managing large amounts of data stored in databases, storage systems, or other repositories can be used for a variety of functions, often supporting activities such as accounting, operations, finance, marketing, and numerous other activities. However, large amounts of data often increase the complexity of operation for enterprise applications.

Providers of enterprise applications, which are often distributed throughout an organization, must meet increasing data requirements for operation, which includes the creation, maintenance, management, and use of data maps. Data maps, which direct various software applications to necessary and relevant portions of other software applications, are used in the execution or operation of other, often more complex, software applications. The setup and maintenance of large numbers of maps also represents an enormous operational burden on enterprise software applications, particularly in terms of expense and money.

A data or field map is used to identify relationships between multiple data fields in order to enable an application to execute at run-time or compile program code. Field maps may often be used to map data contained in tables, records, files, fields, or other structures where data can be stored. In a typical field map, a data source can be mapped to a data target. One example of a data source is a source table, where data is mapped to fields contained in a target table, generating a particular field map. In other words, a target table identifies the data destination for a source table. Tables containing fields may house varying quantities of data, which may be used to different extents by software and enterprise applications. Each field in each table of each map must be accounted for at many levels for use in various types of software applications. Conventional data mapping techniques and means require manual design and construction, where an individual developer must design individual maps for each data field correlation. Conventional data mapping techniques are labor and time-intensive, requiring developers to design, develop, and implement maps on an often ad-hoc basis. Once determined, data maps must be loaded in order to enable application at run-time to operate and draw upon required data. Again, this process in the conventional art is time and labor intensive.

If a source or target table, as described above, containing multiple data fields, changes, a map designer must review and change a corresponding table map. Changes to a corresponding data map may also be required. After the changes are made, then a data loader map must be rebuilt and each field must be individually and explicitly handled. The developer or user probably has no advance knowledge of changes and will only be aware of problems when an application stops running as a result of an improper data map.

Therefore, there is a need to reduce the time and labor-intensity of conventional data mapping techniques and methods.

SUMMARY OF THE INVENTION

The present invention provides for a method for generating a data map including defining a source object and a target object, applying a rule for defining the source object and the target object, assigning a default value to the target object, and saving the data map to a library. Embodiments of the present invention provide for further defining the source object and the target object based on using a default value to define the target object. In accordance with an embodiment of the present invention, additional definition of the source object and the target object can be accomplished by using a rule to define the target object. Alternatively, defining the source object and the target object may also be accomplished by using the source object to define the target object.

With regard to the use of default values to define the target object, using a record level default value may be implemented as a type of default value. Additionally, a system level default value can be used to define the target object.

In generating the data or field map, background information can be processed to further define the target object. Processing background information can include information based on database platform types and data types. This information is used to determine the resulting field map by enabling the automatic mapping process to generate field maps based on pre-determined or specified criteria such as the type of data base in use or the type of data being called.

In accordance with another embodiment of the present invention, an automatic mapping system is provided, including a data repository, an application engine exchanging data with the data repository, and an automatic mapping engine for generating a field map using data from the data repository. The automatic mapping system can also include a management system, and an interface for exchanging data and information with the application engine and the automatic mapping engine. Further, the data repository of the automatic mapping system also includes a presentation layer a data layer and an engine layer.

In accordance with an embodiment of the present invention which includes the above-referenced automatic mapping system, the presentation layer can include a data source for providing a source field, a map designer for designing a field map, and a scheduler for integrating the field map. In the data layer, the automatic mapping system can also include an extract, transform, and load (ETL) engine, a data transformation module exchanging data with the automatic mapping engine, and a query module for structured calling of data from the data repository based on the field map using a querying language such as SQL, although the present invention is not limited to the use of this programming language.

The automatic mapping engine can include an initialization module for initializing field map generation, a rules module for administering a map rule for the automatic mapping engine, default module for specifying a default field value, a map definition module for integrating the map rule and the default field value to define a target field, a field conversion module for converting the target field using the map definition module, and a field map generator for generating a field map.

Provided in another embodiment of the present invention is an apparatus for generating a data map including a means for defining a source object and a target object, a means for applying a rule for defining the source object and the target object, a means for assigning a default value to the target object, and a means for saving the data map to a library.

Still further, another embodiment of the present invention provides for a computer data signal embodied in a carrier wave comprising code for defining a source object and a target object, code for applying a rule for defining the source object and the target object, code for assigning a default value to the target object, and code for saving the data map to a library. A further embodiment of the present invention provides for a computer readable medium storing instructions for generating a field map comprising defining a source object and a target object, applying a rule for defining the source object and the target object, assigning a default value to the target object; and saving the data map to a library. A further understanding of the nature and advantages of the inventions herein may be realized by referring to the remaining portions of the specification and the attached drawings.

BRIEF DESCRIPTION OF THE DRAWINGS

FIG. 7 is an exemplary data table showing fields used in conjunction with an embodiment of the present invention.

DETAILED DESCRIPTION OF THE PREFERRED EMBODIMENT

Figure 1:
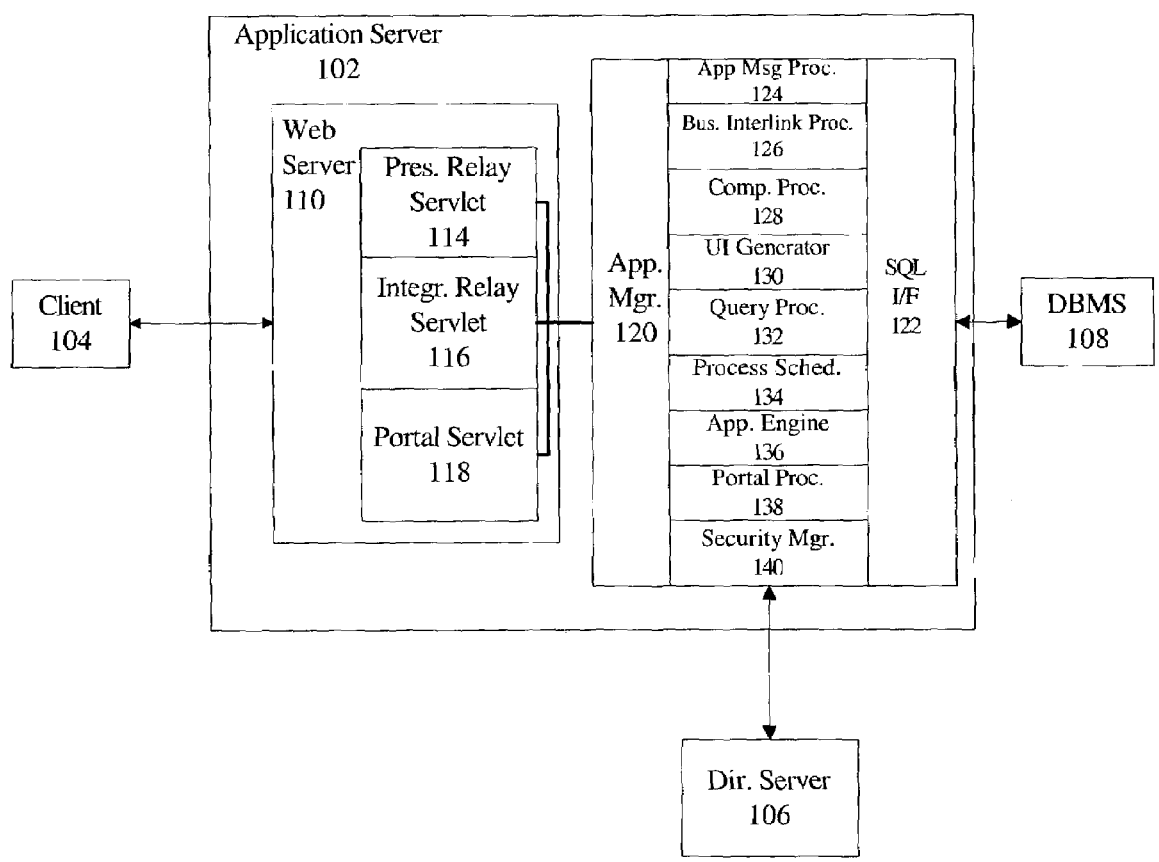
FIG. 1 is an exemplary block diagram of an application system illustrating an application server, a client, a directory server, and a database management system (DBMS)

As shown in the exemplary drawings wherein like reference numerals indicate like or corresponding elements among the figures, exemplary embodiments of an automatic data mapping system and method according to the present invention will now be described in detail. The following description sets forth an example of an automatic mapping engine designed to simplify the source to target mapping effort by automating a significant amount of data mapping at run time. Embodiments according to the present invention provide for automatically mapping a source data field to a target data field, particularly where large amounts of data may require correspondingly large numbers of maps within the execution or run time of software such as enterprise applications.

Automatic data mapping provides for the definition and generation of data maps or "field maps" between a source data object and a target data object. Data can be stored within database and database platform management systems such as SQL Server, OS390, Sybase, Oracle, DB/2, Unix and other platforms known by those of ordinary skill in the art. Data held within data structures such as a record, table or field require maps, which can be automatically generated and adjusted (for data changes, errors, deletions, modifications, etc.) by the present invention. The following embodiments describe automatic data mapping systems, methods, and processes to enable one of ordinary skill in the art to implement the present invention. The following descriptions include exemplary embodiments, including an automatic data mapping engine operating within an application server environment and application engine.

FIG. 1 is an exemplary block diagram of an application system 100 illustrating an application server 102, a client 104, a directory server 106, and a database management system (DBMS) 108. Communication between the client 104, directory server 106 and the database management system 108 includes, but is not limited to, the exchange of data and information. The client 104 may be implemented using a variety of devices such as a server, personal computer, computing device, mainframe computer, mini-computer, wireless computing device, or other means as envisioned by one of ordinary skill in the art.

Within application server 102, a web server 110 is shown. Web server 110 houses various sub-applications or servlets, which operate as software modules for the presentation of content in a web-based format. In FIG. 1, web server 110 houses presentation relay servlet 114, an integration relay servlet 116, and a portal servlet 118. Presentation relay servlet 114 communicates with integration relay servlet 116 to send and display content via portal servlet 118. Data is exchanged between web server 110, application manager 120, SQL interface 122, and application services 124-140. Application manager 120 manages data communication between the web server 110 and the application services 124-140. SQL interface 122 manages data access and communication with database management system 108.

Application services 124-140 can be implemented as a series of software modules within application server 102. Although the illustrative embodiment is represented as having those software modules shown, application services 124-140 can be implemented using one or more software modules and is not limited to the embodiment shown. In FIG. 1, application services 124-140 include an application messaging processor 124, a business interlink processor 126, a component processor 128, a user interface generator 130, a query processor 132, a process scheduler 134, an application engine 136, a portal processor 138, and a security manager 140. Application engine 136 will be described in further detail in connection with FIG. 2 below. The illustrative embodiment shown is directed towards the implementation of a business-function enterprise application such as accounting, inventory or supply management, operations, finance, etc. Application messages are managed in terms of publishing, subscribing, and delivery by application messaging processor 124. Third-party software systems are managed by business interlink processor 126. Other enterprise application modules or components are managed by component processor 128. User interfaces are generated by UI generator 130. In conventional enterprise applications, application engine 136 provides the necessary functionality to enable manual creation and management of data mapping.

Figure 2:
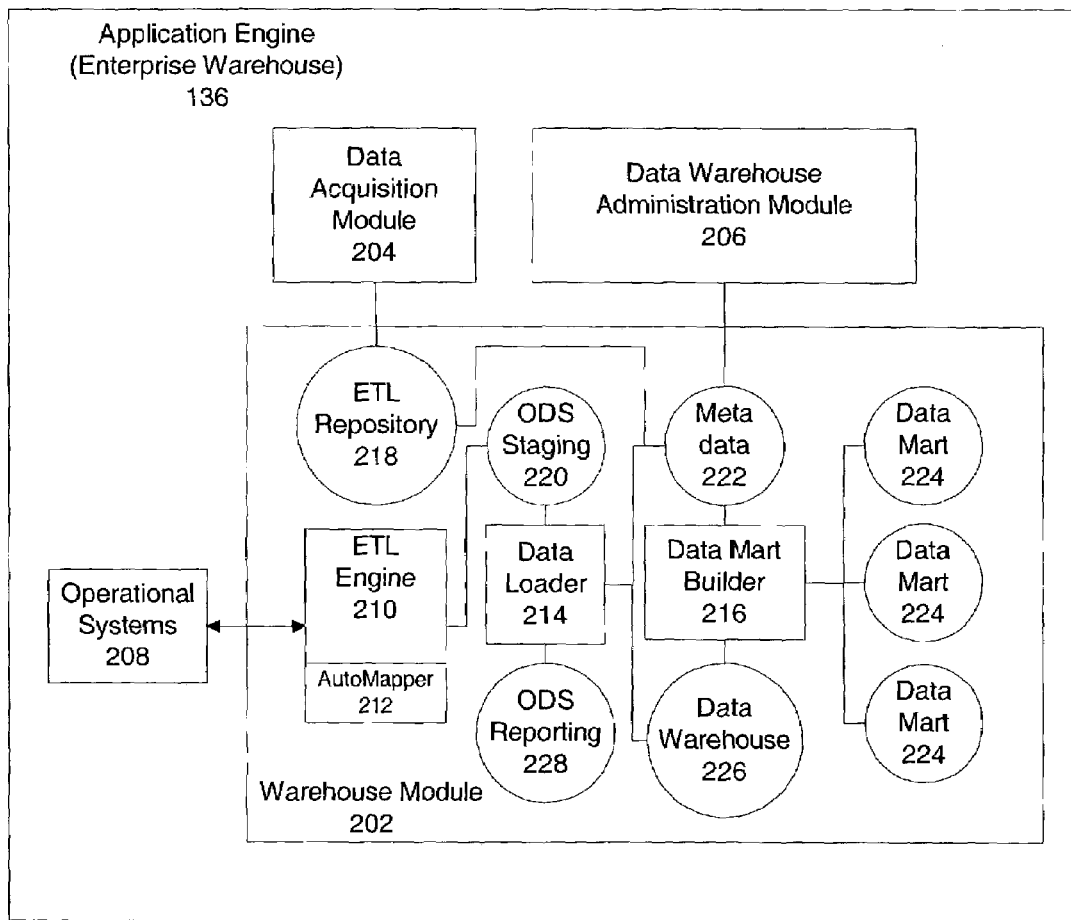
FIG. 2 is an exemplary block diagram of an application engine.

FIG. 2 illustrates an application engine 136 in accordance with an embodiment of the present invention. In this embodiment, the application engine 136 is intended for implementation in a data warehouse context to support a larger software application such as a business enterprise application. In a software implementation, application engine 136 can be implemented as a standalone program or as an integrated component within the context of a larger functional enterprise application. The software for implementing application engine 136 can be installed, compiled, and executed in a variety of devices including personal computers, servers with various operating systems, mainframe computers, mini-computers, portable computing devices, or other software computing implementation means not mentioned herein. One of ordinary skill in the art will recognize that other implementation methods and systems for software executing embodiments of the present invention may be envisioned. The present invention is not intended to be limited to only those iterations described herein. However, one of ordinary skill in the art may envision implementation contexts other than those described herein, thus not limiting the present invention to those embodiments shown.

A warehouse module 202 is shown housed within application engine 136. Also shown are data acquisition module 204, data warehouse administration module 206, and operational systems 208. Within warehouse module 202 are an Extract, Transform, and Load Engine (ETL) 210 and an automatic data mapping engine 212, in accordance with an exemplary embodiment of the present invention. The automatic data mapping engine 212 provides for automatic data mapping capabilities and features, including exception handling, in accordance with an embodiment of the present invention.

Modules for data loader 214 and data mart builder 216 are also shown. Operational systems 208 exchange data with ETL engine 210 which receives data maps generated automatically by automatic data mapping engine 212. An ETL repository 218 exchanges data with data acquisition module 204. Data exchange between operational systems 208, ETL engine 210, ETL repository 218, and data acquisition module 204 can be implemented in several ways. For example, an application programming interface (API) may be used to integrate data and information from operational systems 208 for a variety of formats, languages, and protocols (e.g., HTML, XML, XHTML, HTTP, etc.). Elements of an operational data store (ODS) are shown in communication with data loader 214. An ODS staging module 220 stages mapping metadata and other data from ETL engine 210, which is loaded and implemented for overall application use by data loader 214. Using data warehouse administration module 206, a user can direct the deposit of metadata to metadata module 222. After exchanging data with data mart builder 216, metadata, which is used to assist in creating field maps, is stored and managed for access within data mart 224. An additional data storage facility is provided by data warehouse 226, which receives stored data from data mart builder 216 and metadata module 222. Data which is loaded and stored in either data mart 224 or data warehouse 226 may be reported to users via ODS reporting module 228 which provides generated reports for review via either operational systems 208 or the data warehouse administration module 206. Alternatively, one of ordinary skill in the art may envision implementations whereby ODS reporting module 228 may exchange data directly with operational systems 208 and data warehouse administration module 206 using fewer or more intermediary modules such as data loader 214, ODS staging module 220 or ETL engine 210.

Figure 3:
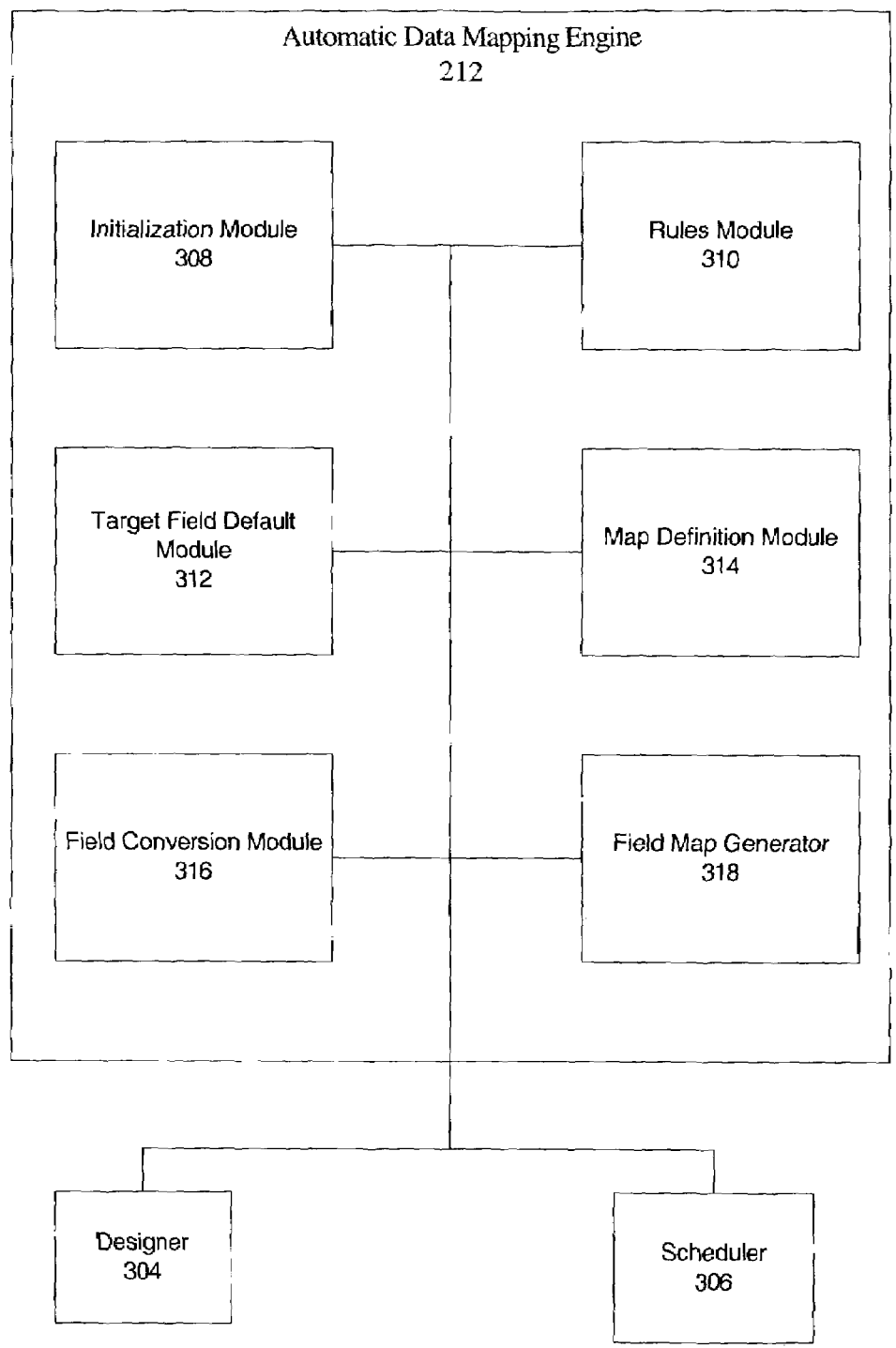
FIG. 3 is an exemplary block diagram of an automatic data mapping system.

FIG. 3 provides further detail as to an automatic data mapping system in accordance with an embodiment of the present invention. An automatic data mapping system 300 is shown, including automatic data mapping engine 212, map designer 304, and scheduler 306. The map designer 304 is intended to provide users of various operational systems 208 (FIG. 2) with the ability to manage automatic data mapping. In one embodiment, a user, via a client 104, may provide instructions and data to map designer 304 for specifying rules and/or default values during the automatic data mapping process (described below in FIG. 6). One of ordinary skill in the art may envision embodiments where a user may either locally or remotely enter instructions and data for guiding the automatic data mapping engine 212.

The scheduler 306 provides the ability to schedule data maps for implementation and use. Within automatic data mapping engine 212, an initialization module 308, a rules module 310, a target field default module 312, a map definition module 314, a field conversion module 316 and a field map generator 318 are shown. Rules governing the automatic data mapping process can be entered by a user and integrated with the mapping process using rules module 310. For example, a rule specifying that only those fields entitled "color" should be selected for automatic mapping between available source and target fields can be entered into rules module 310 using an interface. A typical interface may include an API or other programming interface intended to permit user input. A user can also specify rules such as these or others as one of ordinary skill in the art may envision.

Regardless of whether automatic mapping rules are entered, the automatic data mapping engine 212 automatically generates data maps, also incorporating default values for selected fields using target field default module 312 and map definition module 314. Map definition module 314 defines field maps using various inputs from rules module 310 and target field default module 312. Using either pre-specified rules or default values for target fields, map definition module 314 creates the map definition, from which field map generator 318 will generate the resulting field map. Continuing the above example, if "color" is a field to be selected for automatic data mapping, then a user can assign a default value of "blue" to this field, if it were to appear, overriding any other existing rules governing the mapping process. The user also provides for exception handling, where there may be exceptions that the user either desires or must address during the automatic data mapping process.

Once a map has been automatically generated using both rules and default values from rules module 310 and target field default module 312, respectively, the target field is converted using field conversion module 316. Finally, the resulting map is generated by field map generator 318. The modules within automatic data mapping engine 212 exchange data and communicate to enable the generation of the data maps or field maps. One of ordinary skill in the art may envision fewer or additional modules, but the embodiment described herein is not intended to be limiting upon the overall nature of the automatic data mapping process and system claimed by the Applicants. Further, the automatic data mapping process and the associated rules are described in greater detail with regard to FIG. 6.

Figure 4:
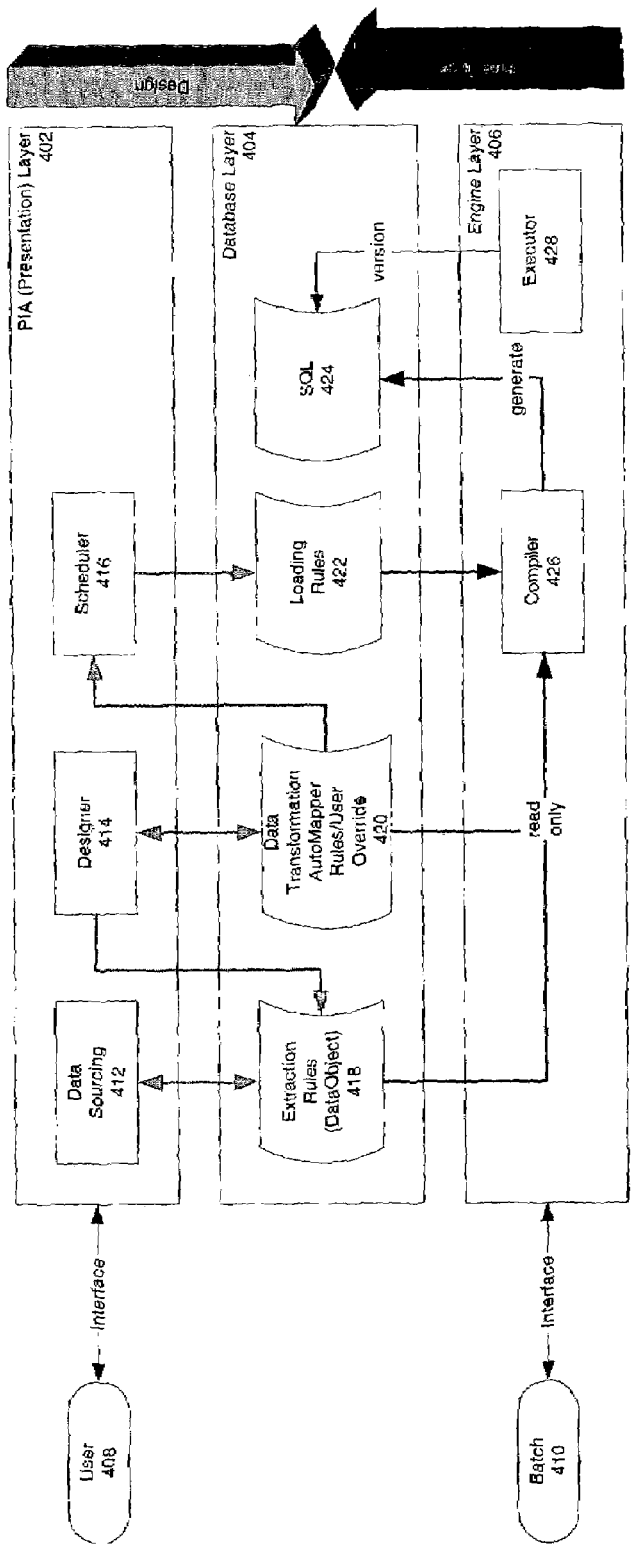
FIG. 4 is an exemplary block diagram of a data transformer architecture incorporating an automatic data mapping engine in accordance with an embodiment of the present invention.

FIG. 4 is an exemplary block diagram of a data transformer architecture incorporating an automatic data mapping engine 400 in accordance with an embodiment of the present invention. Illustration of data flow is as indicated in the three primary layers representing a presentation (PIA) layer 402, a database layer 404, and an engine or application layer 406. The presentation layer 402 represents the layer of software architecture which, in accordance with an embodiment of the present invention, renders content, information, and data to the user for external display.

The database layer 404 represents the layer of the schema where data is extracted, transformed, and loaded from data repositories in order for the presentation layer 402 to present content, information, or data to a user 408. At the engine or application layer 406, data is aggregated in batch 410 for compilation and execution during run-time. As indicated to the right of FIG. 4, the presentation layer 402 is wholly represented as part of design-time processes during the operation of the automatic data mapping system and methods described herein. However, as presentation of content, information, and data may occur before, during, or after either the design or run-time phases (i.e., the user runs a report to view the generated field maps), the presentation layer described herein is not intended to be limited to only design-time phase activities, in accordance with an alternative embodiment of the present invention. The database layer 404 represents processes in both design-time and run-time in the operation of the automatic data mapping systems and methods described herein. Finally, the engine layer provides operations which exist wholly in run-time.

Throughout the presentation layer 402, a data sourcing module 412, a designer 414, and a scheduler 416 provide rules and operating parameters by which the automatic mapping process operates. At the database layer 404, four (4) stored data modules are shown, including extraction rules governing the selection of data and data objects from databases, repositories, warehouses, data marts, or other storage media and facilities, which are incorporated by extraction rules module 418. One of ordinary skill in the art may envision the use of fewer or more stored data modules than those shown in FIG. 4. The embodiment described herein is not intended to be limiting in any fashion other than to provide enabling guidance on the development and integration of the various modules and rules for automatic data mapping. The data transformation module 420 contains the automatic data mapping rules and any user override or exception handling rules that may be entered by a user. Communicating with the designer 414 and the scheduler 416, the data transformation module 420 provides the automatic mapping input to the engine layer 406, whose operation will be described below.

Referring back to the database layer 404, the data transformation module 420 passes data to the scheduler 416, providing input for the creation, management, and scheduling of field maps. Loading rules module 422 governs the implementation of the field maps for eventual use by the end application or application services that require the data maps. An SQL module 424 provides for the interface and exchange of data for querying, retrieving, and storing data in various data repositories. Although SQL is described in the preferred embodiment, one of ordinary skill in the art may envision other query languages which may be used for the purpose of exchanging data with various data structures and repositories, e.g., MySQL, etc. Finally, the engine layer 406 compiles, executes, and generates the field maps resulting from the automatic mapping process for integration into an end application such as operational systems 208 (FIG. 2) which may be an enterprise application, software program, etc.

A compiler 426 compiles the necessary software or program code defining the field maps, which in turn generates the field maps which govern the exchange of data to and from any data structures or repositories, using SQL module 424. The executor 428 provides run-time execution of the field maps, exchanging data with SQL module 424 in the data base layer for version control of the various field maps. The SQL module 424 is a library which stores the SQL steps generated by the run-time compiling of the requests or "calls" compiler 426 for field-maps which are generated by compiling code for the ETL engine 210 (FIG. 2). The resulting field maps are generated and executed by executor 428. Also, SQL module 424 maintains version control over field maps, to ensure that the most recent and updated field maps are used by executor 428.

Figure 5A:
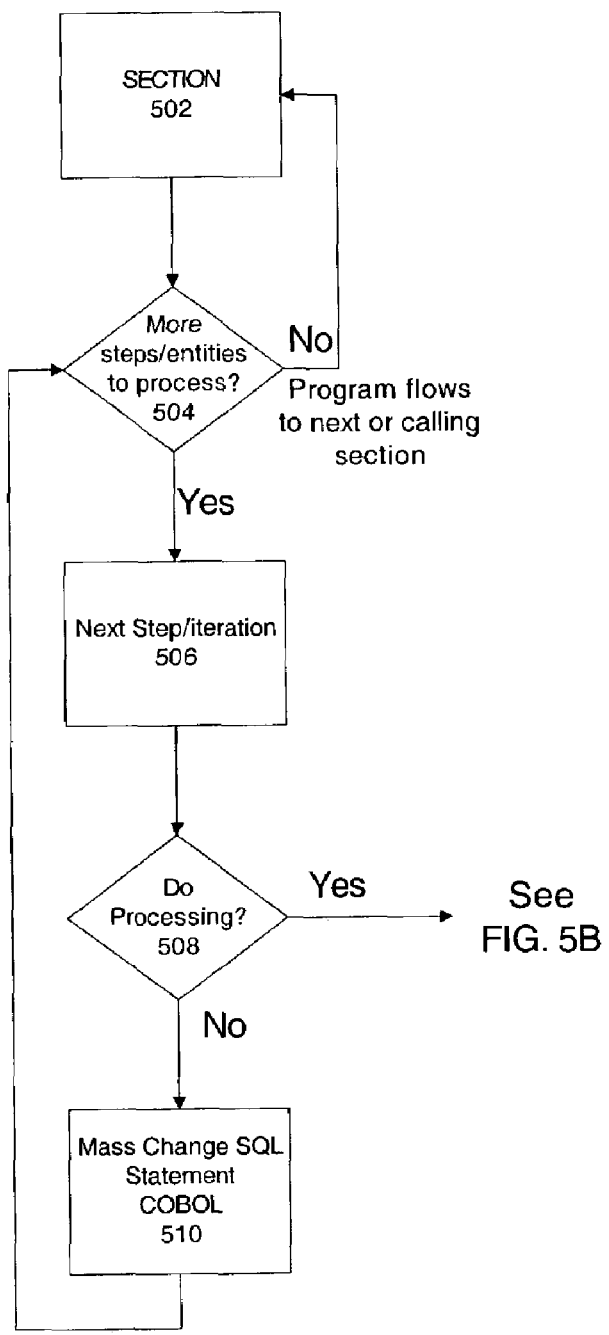
FIG. 5A is an exemplary flow chart of an application engine logic in accordance with an embodiment of the present invention.
Figure 5B:
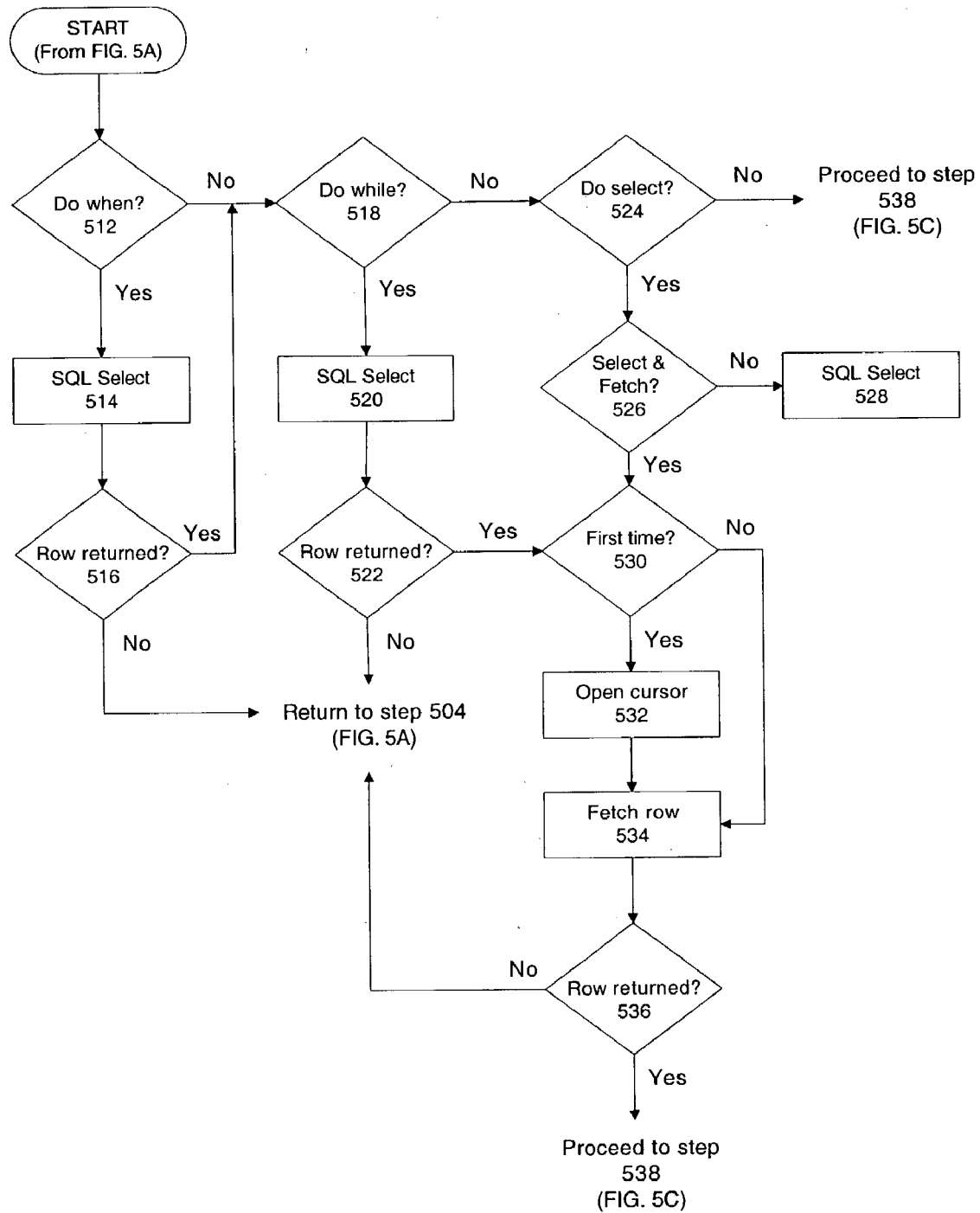
FIG. 5B is a further exemplary flow chart of an application engine logic in accordance with an embodiment of the present invention.
Figure 5C:
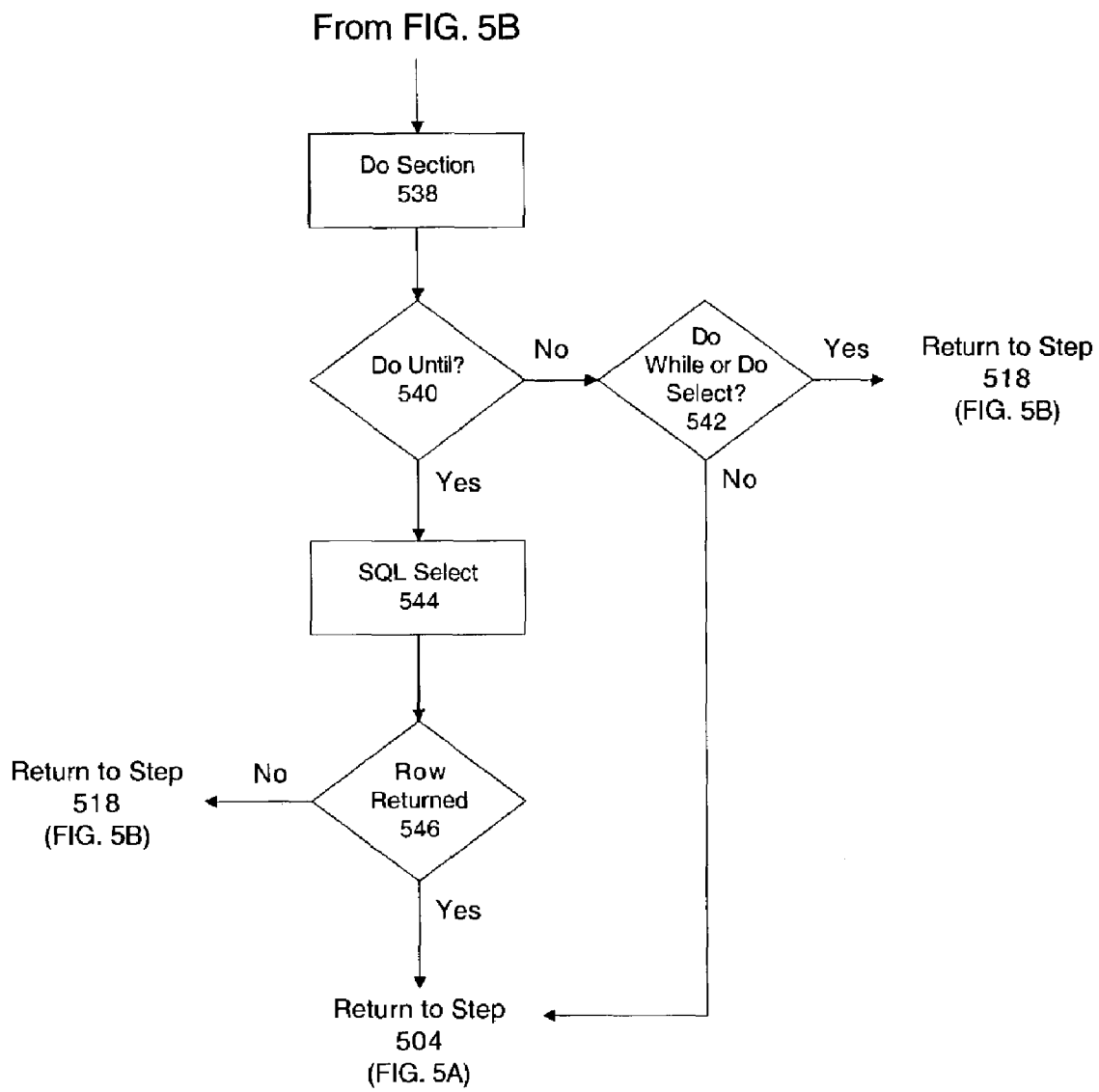
FIG. 5C is a further exemplary flow chart of an application engine logic in accordance with an embodiment of the present invention.

FIGS. 5A-5C describe the overall application engine and server environment, in accordance with an embodiment of the present invention. In one embodiment, the automatic data mapping engine 212 operates and exchanges data with an application server 102, which is integrated with an application engine 136. An exemplary application engine 136 can be an ETL engine, for extracting, transforming, and loading data from a data structure, data repository, or other database platform. For example, one implementation of an application engine 136 is an ETL engine found in the data transformer module developed by PeopleSoft, Inc. A person of ordinary skill in the art may also envision using other application engines, but not limited to those found herein.

FIGS. 5A-5C describe the logic flow of application engine 136, which provides the operating environment for the automatic data mapping engine 212. The automatic data mapping engine 212 operates as a sub-module to the application engine 136 (FIG. 1) and is further described below. In order to evaluate a called or next-selected section of data in step 502, the application engine 136 applies a series of processing functions to each called section of data. The application engine 136 also determines what and how many sections of data should be processed and what, if any, sub-sections, steps, or entities within the called section of data are to be processed. A step or entity can be a sub-section of data within a called section of data. Processing encompasses a variety of activities, some of which are performed by the processing modules shown in FIG. 1, e.g., query processor 132, component processor 128, business interlink processor 126, etc. The sub-section of data may be a collection of fields, tables, or other data structures within the section of data. Applied to these data structures are a series of SQL statements or commands.

Examples of SQL statements which are used in embodiments of the present invention include "do" statements. "Do" statements represent control loops similar to those found in second and third-level programming languages such as C, C++, SQL, MySQL, etc. FIGS. 5A-5C use several SQL statements such as "do while," "do when," "do until," and "do select." The "do" control loops represent logic loops which are performed until a particular condition or parameter is met. For example, in a "do while" SQL statement, a particular set of instructions are executed by the application engine 136 until a condition or parameter is met.

Referring to FIG. 5A, if, within the current section of data, there are more steps or entities (e.g., fields, tables, etc.) which require processing, then the application engine 136 proceeds to step 506. If not, then the application engine 136 (FIG. 1) moves to the next or calling section of data. In step 508, the application engine 136 determines whether the current section of data is to be processed. If the current section of data is to be processed, then the application engine 136 proceeds to the logic flow path described in FIG. 5B. If not, then a mass change SQL statement is generated in COBOL in step 510, the changes are recorded in a library within SQL module 424 (FIG. 4), and the application engine returns to step 504 to determine whether more steps or entities require processing within the current section of data.

In FIG. 5B the application engine 136 performs a series of evaluations to identify and process specific data fields. The goal of the application engine 136 logic is to determine a rowset from a data table is delivered in response to several logic control loops which are performed by the application engine 136. The application engine 136 filters data from a database and a database management system in response to SQL statements, conditions, and values sought by a particular user's query. In step 512, the application engine 136 determines whether a series of SQL statements should be applied during the application engine program flow. SQL statements are numeric expressions which evaluate one value against another value, range, or alternative in order to determine a specific data field, table, rowset, etc. The specific data field, table, rowset or record is returned based upon the resulting evaluation of the SQL statement. Examples of "do when," "do while," "do select," and "do until" are shown in FIGS. 5A-5C, but the present invention is not limited to those statements illustrated herein.

Application engine 136 determines in step 512 whether a "do when" SQL statement exists. If yes, then the application engine 136 evaluates the called section of data using the "do when" SQL statement in step 514, which ultimately returns or "selects" a data result based upon the evaluation. In step 516, the application engine 136 determines whether a rowset has been returned as a result of the application engine 136 evaluating the "do when" statement. If no rowset is returned, then the application engine returns to step 504 in FIG. 5A. If a rowset is returned or if no "do when" SQL statement is present, then the application engine 136 continues to step 518 to determine whether a "do while" statement exists. Again, if a "do while" statement does not exist, then the application engine 136 will continue to determine whether a "do select" or a "do until" SQL statement exists, as described below.

In step 518, the application engine 136 performs a similar evaluation to determine a specific result using a "do while" SQL statement. In step 518, if a "do while" SQL statement is present, then the application engine 136 evaluates the "do while" SQL statement in step 520 to determine a specific rowset, which is returned in step 522. If a "do while" SQL statement is not present, then the application engine 136 will determine whether a "do select" SQL statement exists in step 524.

Referring back to step 522, if no rowset is returned as a result of the evaluation of the "do while" SQL statement, then the application engine 136 returns to step 504 in FIG. 5A. However, if a row is returned, then the application engine 136 determines whether the resulting rowset is returned for the first time in step 530. Referring back to step 524, if a "do select" SQL statement exists, then the application engine then determines whether "step" and "fetch" SQL statements are present in step 526. If "step" and "fetch" SQL statements are not present, then the application engine 136 applies the "do select" SQL statement to the current section of data. If a "step" and "fetch" SQL statement are not present, then the application engine 136 determines whether the rowset returned from step 522 has been returned a first time. If a rowset is returned from the "do while" SQL statement but is not returned for the first time (step 530), then the application engine 136 proceeds to step 534 to perform a fetch SQL statement based upon one or more default values and rules. If a rowset is returned for the first time from the "do while" SQL statement, then the application engine 136 proceeds to step 532 issues an "open cursor" statement which generates the returned rowset from a database. Subsequently, the next returned rowset is also generated when the application engine 136 issues a "fetch row" statement in step 534. After executing the "fetch row" statement, the application engine 136 determines again whether a row is returned. If a row is returned, then the application engine 136 proceeds to FIG. 5C to evaluate a further sequence of SQL statements. If a row is returned, then the application engine 136 returns to step 504 (FIG. 5A) to evaluate the next called section of data.

FIG. 5C represents the logic flow path for the application engine 136 for a further series of SQL statement evaluations. Here, the application engine 136 evaluates the "do when," "do while," and "do select" SQL statements. In step 538, the application engine 136 performs the "do section" process whereby the current section of data is processed in accordance with the processes shown in FIG. 1. In step 540, the application engine 136 determines whether a "do until" SQL statement is present. The "do until" statement provides a condition by which processes applied by application engine 136 until a specific condition occurs. For example, a "do until" SQL statement of "do until =5" may indicate that a particular process is to be performed for five times. One of ordinary skill in the art may envision other conditions besides those examples specified herein for application to any of the SQL statements disclosed herein. If no "do until" statement exists, then the application engine will determine if either a "do while" or a "do select" SQL statement exists in step 542. If the application engine 136 determines that a "do until" SQL statement exists in step 540, then the application engine 136 will execute the process of selecting a row set in step 544.

In step 544, the application engine 136 performs the process of selecting a rowset. In step 546, the application engine 136 determines whether a row is returned from the process of step 544. If a rowset is returned, then the application engine returns to step 504 (FIG. 5A) to evaluate the next called section of data. If no rowset is returned, then the application engine returns to step 518 (FIG. 5B) to determine whether a "do while" SQL statement exists. The application engine 136 and its logic flow procedure represent the environment within which embodiments of the present invention operate. In other words, the automatic data mapping system and method operates within the context of the overall logic of the application engine 136. However, FIGS. 5A-5C represents a generic context for illustrating the logic flow of the application engine 136. The automatic mapping logic flow is integrated with the application engine logic flow in order to generate the necessary field maps, as described in further detail with regard to FIG. 6.

Figure 6:
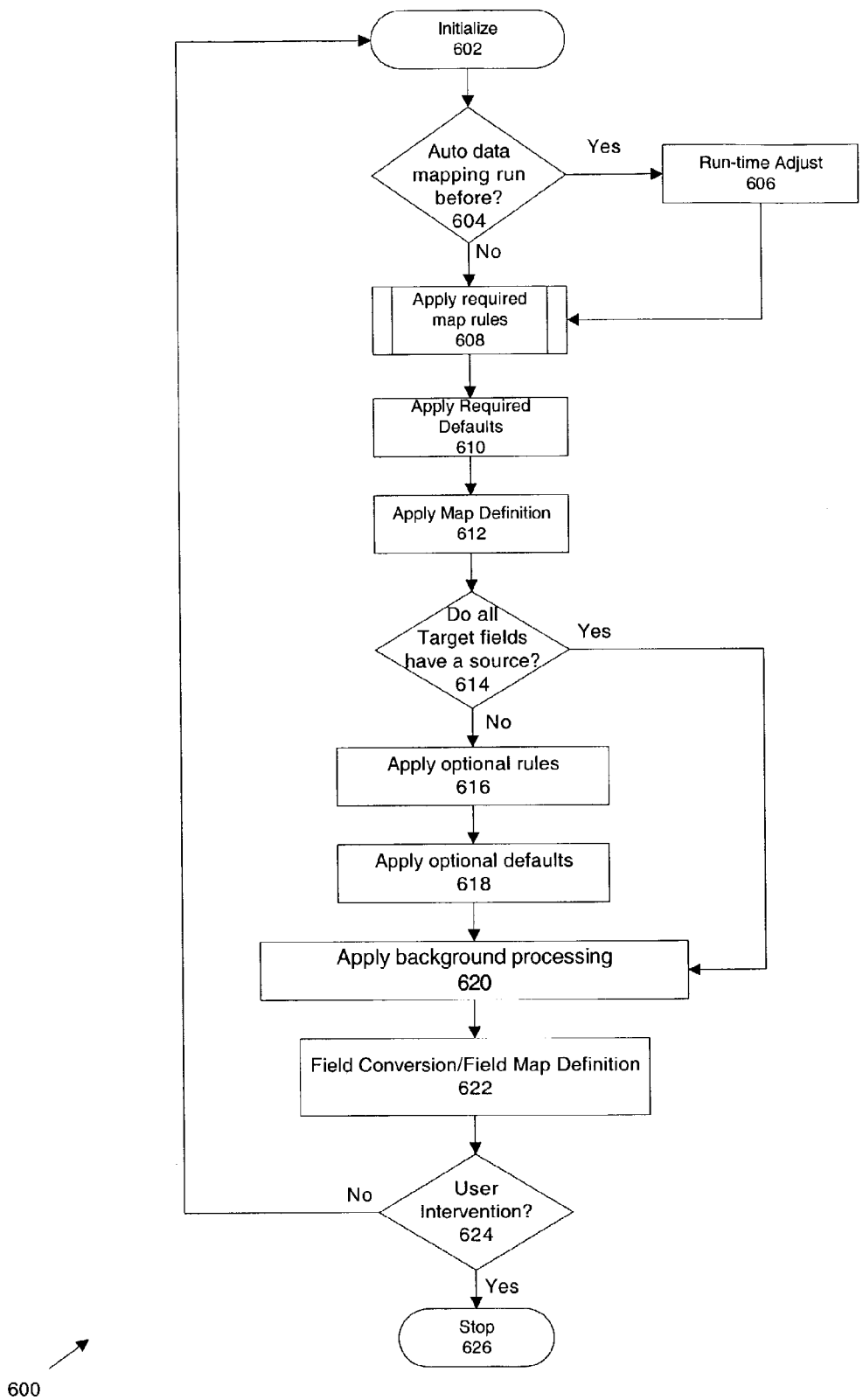
FIG. 6 is an exemplary flow chart illustrating the logic flow of automatic data mapping engine rules in accordance with an embodiment of the present invention.

FIG. 6 describes a logic flow process for automatic data mapping 600, in accordance with an embodiment of the present invention. The process includes the definition and generation of field maps between a source data object and a target data object. As mentioned above, a data object can be a record, table, field, or other data construct as envisioned by one of ordinary skill in the art.

There are five general steps in automatic data mapping, in accordance with an embodiment of the present invention:

1. Apply map rules. The map rule definition captures required transformations, defaults, translation sets, field map hints and applies these rules based on target field;

2. Match the source and target fieldname from an ETL control field list;

3. Apply default data values from Set Target Defaults;

4. Map the remaining target fields without any source input field from the target with specified field constant default values which are contained within specific data tables, fields, records, etc. (e.g., an example of a specific field where a default data value SQL statement may be: PSRECFIELD.DEFFIELDNAME. (SELECT DEFFIELDNAME FROM PSRECFIELD WHERE DEFRECNAME =" AND B.DEFFIELDNAME <>')); and 5. In the background, the automatic data mapping engine 212 will resolve any record structure, changes, data type conversions, truncate row data where the source field length is greater than the target field length, and default any remaining target fields without source input null values with the following null alias:

a. Character" (space) for character field
b. Numeral 0 for numeric field
c. Literal Null for date field In the process shown, the automatic data mapping engine 212 initializes a field map in step 602, referencing any predetermined fields needed for processing. Examples of predetermined fields needed for processing include indications for rows in error, duplicates, etc. At step 604, the automatic data mapping engine determines whether the automatic data mapping process 600 has been previously run. If the automatic data mapping process 600 has been previously run, then the automatic data mapping engine 212 performs a run-time adjust in step 606. During this step, the automatic data mapping engine 212 determines whether any source and/or target data objects have been changed since the last field map was generated. For example, if a target table has had a field added, then the automatic data mapping engine 212 will provide a value for the added field, based on required or optional rules, previous field maps, or required or optional defaults.

If the automatic data mapping process 600 has not been previously run or after performing a run-time adjust, the automatic data mapping engine 212 then applies required map rules (step 608), required defaults (step 610), and map definition (step 612). Examples of required rules include source-to-target mapping (e.g., map Field A to Field B), transformations (e.g., concatenate Fields A and B; truncate Field A), or translations (e.g., if Field A is observed, assign Field C to the target data object or field) which are defined previously, but applied during the design-time generation of field maps.

An example of a required map rule is where Field A is observed, the automatic data mapping engine 212 maps Field A to Field B, thus overriding all other rules and default values.

An example of a required default is where Field A is observed by the automatic data mapping engine 212, then a default value of "10" is inserted in every unassigned Field A. A specific example may be an accounting application which uses a set of default values, specified by a user, to describe accounting-related data, e.g., transaction type, transaction amount, transaction date. However, required default values do not override required rules, but do override optional rules and optional default values.

In step 612, applying the map definition refers to the assignment of a source data object to a target data object, thus defining a field map. Pre-existing field maps, if any, are also applied during this step. In step 614, the automatic data mapping engine 212 determines whether all target data objects have been assigned a value from a source data object. If all target objects are assigned, then the automatic data mapping engine 212 proceeds to step 620 to apply any background processing. If instead all target data objects still do not have a source data object assigned, then the automatic data mapping engine 212 will apply optional rules (step 616) and optional default values (step 618), if any. Examples of optional rules and default values are similar to those described above for required rules and defaults. However, optional rules and default values do not override required rules and values. Further, if there are not optional rules or default values, then the automatic data mapping engine 212 will simply apply background processing in step 620.

As described above, in general, background processing provides for instances where target data objects remain unassigned or without values. Where neither required nor optional rules and default values provide assigned values to target data objects, the automatic data mapping engine 212 will assign a null, void, or blank value. These null values may include "0", "-," a blank space, or any other value which a person of ordinary skill in the art may envision.

After completing the application of background processing, the automatic data mapping engine 212 will perform field conversion, thus defining one or more field maps in step 622.

Following the field map definition in step 622, a user may intervene to stop the automatic data mapping engine 212 in step 624, thus ending the process (in step 626). However, if the user does not intervene to stop the run-time execution of the automatic data mapping engine 212, this process will continue by returning to step 602 from step 624. Ultimately, the automatic data mapping process repeats until a "do" control loop in the application engine 136 environment is fulfilled which stops the process, a user intervention occurs.

An exemplary processing scenario using the automatic data mapping engine 212 may be described as follows. A new date/time field is to be added to each record in a particular section of data within a database. Under the conventional techniques and methods available, a map developer or user would be required to manually input the new date/time field. In accordance with an embodiment of the present invention, a new required rule can be entered to direct the addition of the new field. Specifically, the new required rule can specify a transformation rule whereby a new field "date/time" is added which represents the concatenation of the individual fields "date" and "time." At run-time, the automatic data mapping engine 212 initializes looking for changes to the existing source and target data objects. As a change has occurred, the automatic data mapping engine 212 performs a run-time adjust to search for the changes. Once the change (a new required rule for a new "date/time" field), the automatic data mapping engine applies any required rules and/or any required defaults, performs an intermediate determination as to whether all target data objects or fields have been assigned and, if so, conducts background processing prior to defining and generating field maps. If all target data objects have not been assigned a source data object, then the automatic data mapping engine 212 applies any optional rules and/or defaults. If unassigned target data objects remains, the automatic data mapping engine 212 assigns null values to the unassigned target data objects. A person of ordinary skill in the art may direct the assignment of any type of null value as she may envision.

The automatic data mapping engine 212 and automatic mapping process described herein eliminates the labor, time and expense-intensive nature of setting up and maintaining map and map metadata. Maintenance requirements for field maps are greatly reduced by embodiments of the present invention as the automatic nature of run-time adjustments provides for any changes that occur in the source or target data objects after a field map/field conversion process is run. Conventionally, users must manually correct for changes, errors, duplications, modifications, etc. in order to generate and load data or field maps. Due to the manual efforts involved, a user will only discover a faulty map after it has been loaded, compiled, and run. In an embodiment of the present invention, an incorrect or obsolete field map is corrected during the run-time execution of the application engine 136.

The automatic data mapping engine 212 can generate ETL/data transformer maps based on the source and target object definition along with pre-defined rules to streamline exception handling. In one embodiment of the present invention, the automatic data mapping engine 212 may be integrated with the ETL engine run-time compiler 426 (FIG. 4), which can generate required SQL steps and save them to a library. The automatic data mapping engine 212 provides the user with the ability to automatically map a target field based on an identified source field, default value, and pre-specified rule. The name of the source and target fields or objects is the minimum amount of information required to run the automatic data mapping engine 212 as the names identify which target fields are to be matched to particular source fields.

However, an exemplary data table showing examples of fields that can be evaluated by an embodiment of the present invention is show in FIG. 7.

FIG. 7 provides an exemplary data table, showing data fields 702-708 representing an input value from source, a source field, a target field, and comments. As described above, target fields can be used to generate a field map from data contained within this table. One of ordinary skill in the art, however, may envision the use of other types of data or tables apart from those described herein. Again, the range of applications and types of operations that may be performed by embodiments of the present invention are not intended to be limited to those described herein, which are provided for illustrative purposes.

The automatic data mapping engine 212 also provides for the automatic generation of field maps as well as the ETL functions to implement the field maps for immediate use. In an embodiment of the present invention, field maps can be defined and generated based on the contents of the source and target objects, the database platform, an ETL map, user-defined rules and data conversion, and basic default values. However, in accordance with an embodiment of the present invention, field maps generated by automatic data mapping engine 212 can be overridden by ETL map definition. Working in conjunction with the automatic data mapping engine 212, the application engine 136 (FIG. 1) will resolve any record structure, changes, data type conversions, truncate row data where the source field length is greater than the target field length, and default any remaining target fields without source input null values with the following null alias:

a. Character" (space) for character field
 b. Numeral 0 for numeric field
 c. Literal Null for date field Alternatively, in some embodiments, each field on a target field or object is handled using the following four steps:

1. Match the source and target fieldnames. If a field is on the source and target objects, then these objects are added to the field map. Truncate/Round/Handle data conversions according to the ETL field conversion table are performed, each of which is user specified.
2. Apply map field definitions. Map/field level definitions override the automatic data mapping engine 212 logic flow illustrated in FIG. 6. The automatic data mapping engine 212 handles specific mappings, transformations, rules, translation sets, and default values based on the target field or object. The rules may be either map-specific or applied universally to all maps, as defined by the user.
3. Apply record level defaults. The automatic data mapping engine 212 uses record level defaults for unassigned target fields or objects.
4. Apply system level defaults. If a target field or object still has no assignment, the automatic data mapping engine 212 will use a literal value (space, zero, or null) to define the target field or object.

The above four steps define, in sum, the four basic types of rules and default values which can be applied in either a "required" or "optional" state. In steps 3 and 4 of the alternative logic flow embodiment above, defaults can be defined as either record level or system level defaults. These default values guide the logic flow process to ultimately enable automatic data mapping.

The novel and inherent improvements over the elimination of onerous conventional techniques for establishing data maps is overcome by embodiments of the present invention, as described herein and further imagined by one of ordinary skill in the art, given the above-description.

The above description is illustrative and not restrictive. Many variations of the invention will become apparent to those of skill in the art upon review of this disclosure. For examples, the steps described in the above flow charts may be performed in a different order or not all steps may be performed. The scope of the invention should, therefore, be determined not with reference to the above description, but instead should be determined with reference to the appended claims along with their full scope of equivalents.

What is claimed is:

1. A computer-implemented method for automatically generating data maps used by applications, the method comprising:

receiving information at a computer system identifying a section of data in a data repository having a source object and a target object;

receiving information at the computer system specifying a set of map rules, each map rule in the set of map rules configured to match source objects in the data repository to target objects in the data repository in response to a set of criteria;

receiving information at the computer system defining literal data as a set of default values to be assigned to fields of the target objects in the data repository where no match is found by the computer system based on the set of map rules between the source objects in the data repository and the target objects in the data repository, each default value in the set of default values comprising predetermined literal data;

applying the set of rules to the source object and the target object using the computer system to determine a match between the source target and target object based at least one map rule in the set of map rules, if the computer system determines a match based on the set of rules between the source object and the target object, automatically constructing a first map definition for the section of data in the data repository using the computer system based on the at least one rule thereby assigning the source object to the target object, wherein a field map created from the first map definition assigns data in the data repository associated with the source object to the target object;

if the computer system fails to yield a match based on the set of rules between the source object and the target object, automatically constructing a second map definition for the section of data in the data repository using the computer system thereby assigning a default value in the set of default values to the target object, wherein a field map created from the second map definition assigns literal data associated with the default value in the set of default values to the target object; and generating the field map using the computer system based on the first or second map definition.

2. The method of claim 1 wherein the literal data associated with the default value comprises a record-level default value.

3. The method of claim 1 wherein the literal data associated with the default value comprises a system-level default value.

4. The method of claim 1 wherein the at least one rule in the set of rules specifies information that defines a transformation of the source object to the target object for the first map definition constructed by the computer system.

5. The method of claim 1 wherein the at least one rule in the set of rules specifies information that defines a translation of the source object to the target object for the first map definition constructed by the computer system.

6. The method of claim 1 wherein the at least one rule in the set of rules specifies information that assigns the source object to the target object for the first map definition constructed by the computer system.

7. The method of claim 1 further comprises assigning literal data associated with a system level or a record level default value to the target object using the computer system based on the field map.

8. The method of claim 1 further comprising processing background information using the computer system to further define the target object based on one or more of record structure or data type conversion.

9. The method of claim 8 wherein processing the background information further comprises processing information using the computer system based on a platform type and a data type.

10. The method of claim 1 further comprising:
   detecting a modification using the computer system in the section of data in the data repository; and
   adjusting the target object using the computer system based on the modification.

11. An automatic mapping system comprising:
   a data repository;
   application server hardware configured to exchange data with the data repository; and
   a mapping engine hosted by the application server hardware and configured to automatically generate a field map, absent direct user intervention, using a source object and a target object from the data repository based on information specifying a set of map rules, each map rule in the set of map rules configured to match source objects in the data repository to target objects in the data repository in response to a set of criteria, and information defining literal data as a set of default values to be assigned to fields of the target objects in the data repository where no match is found based on the set of map rules between the source objects in the data repository and the target objects in the data repository, each default value in the set of default values comprising predetermined literal data,
   wherein the mapping engine automatically defines the field map to assign literal data associated with a default value in the set of default values to the target object when the set of map rules fails to yield a match between the target object and the source object, and
   wherein the mapping engine automatically defines the field map to assign data in the data repository associated with the source object to the target object when at least one of the map rule in the set of map rules yields a match between the target object and the source object.

12. The automatic mapping system of claim 11 wherein the data repository further comprises:
   a management system; and
   an interface for exchanging data and information with the application server and the mapping engine.

13. The automatic mapping system of claim 11 wherein the data repository further comprises:
   a presentation layer;
   a data layer; and
   an engine layer.

14. The automatic mapping system of claim 13 wherein the presentation layer further comprises:
   a data source for providing a source field;
   a map designer for designing the field map; and
   a scheduler for integrating the field map.

15. The automatic mapping system of claim 13 wherein the data layer further comprises:
   an ETL engine for extracting, transforming, or loading data;
   a data transformation module exchanging data with the mapping engine; and
   a query module for structured calling of data from the data repository based on the field map.

16. The automatic mapping system of claim 11 wherein the mapping engine further comprises:
   an initialization module for initializing field map generation;
   a rules module for administering the set of map rules for the mapping engine;
   default module for specifying literal data associated with the set of default values;
   a map definition module for integrating the set of map rules and the set of default values to define a target field;
   a field conversion module for converting the target field using the map definition module; and
   a field map generator for generating the field map.

17. An apparatus that includes a processor for automatically generating data maps used by applications, the apparatus comprising:
   means for receiving information identifying a section of data in a data repository having a source object and a target object;
   means for receiving information specifying a set of rules configured to match source objects in the data repository to target objects in the data repository;
   means for receiving information defining literal data as a set of default values to be assigned to target objects in the data repository where no match is found between source objects in the data repository and the target objects in the data repository based on the set of rules, each default value in the set of default values comprising predetermined literal data;
   means for determining whether the source target matches the target object based on the set of rules,
   means for, if the means for determining yields a match based on the set of rules between the source object and the target object, automatically defining a field map for the section of data in the data repository, wherein the field map assigns data in the data repository associated with the source object to the target object;
   means for, if the means for determining fails to yield a match based on the set of rules between the source object and the target object, automatically defining a field map for the section of data in the data repository, wherein the field map assigns literal data associated with a default value in the set of default values to the target object; and
   means for generating the field map.

18. A computer program product embodied on a computer readable medium storing instructions operational when executed by a computer system for automatically generating field maps used by applications, the computer program product comprising:
   code for receiving information identifying a section of data in a data repository having a source object and a target object;
   code for receiving information specifying a set of rules configured to match source objects in the data repository to target objects in the data repository;
   code for receiving information defining literal data as a set of default values to be assigned to target objects in the data repository where no match is found between source objects in the data repository and the target objects in the data repository based on the set of rules, each default value in the set of default values comprising predetermined literal data;

code for determining whether the source target matches the target object based on the set of rules, code for, if a match is found based on the set of rules between the source object and the target object, automatically defining a field map for the section of data in the data repository, wherein the field map assigns data in the data repository associated with the source object to the target object;

code for, if a match is not found based on the set of rules between the source object and the target object, automatically defining a field map for the section of data in the data repository using, wherein the field map assigns literal data associated with a default value in the set of default values to the target object; and code for generating the field map.

19. A method performed by a computer system for servicing requests for data, the method comprising:

receiving a request at the computer system from a user interacting with an application to access data stored in a data repository;

identifying a first set of fields in a plurality of database fields at the computer system based on the request;

determining a second set of fields in the plurality of database fields at the computer system;

obtaining a set of required rules, a set of required default values, a set of optional map rules, and a set of optional default values at the computer system; each rule in the set of required rules specifying criteria that enable the computer system to match source fields in a database to target fields in the database, each required default value in the set of required default values specifying literal data used by the computer system to assign to target fields in the database, each optional rule in the set of optional rules specifying criteria that enable the computer system to match source fields in the database to target fields in the database without overriding a matching based on the set of required rules and literal data specified in the set of required default values, each optional default value in the set of optional default values specifying literal data used by the computer system to assign to target fields in the database without overriding a matching based on the set of required rules and literal data specified in the set of required default values;

determining at the computer system whether a field in the first set of fields matches a field in the second set of fields based on the set of required rules;

if a match is determined at the computer system based on the set of required rules, defining a field map at the computer system between the field in the first set of fields and the field in the second set of fields based on an action specified in one or more satisfied required rules in the set of required rules;

if a match is not determined at the computer system based on the set of required rules, determining at the computer system whether to assign a required default value to any fields in the first set of fields;

based on a determination at the computer system to assign a required default value to a field in the first set of fields, defining at the computer system a field map for the field in the first set of fields where literal data associated with a required default value in the set of required default values is specified to populate the field in the first set of fields;

determining at the computer system whether a field in the first set of fields matches a field in the second set of fields based on the set of optional rules;

if a match is determined at the computer system based on the set of optional rules, defining a field map at the computer system between the field in the first set of fields and the field in the second set of fields based on an action specified in one or more satisfied optional rules in the set of optional rules without overriding a matching based on the set of required rules and literal data specified in the set of required default values;

if a match is not determined at the computer system based on the set of optional rules, determining at the computer system whether to assign an optional default value to any fields in the first set of fields;

based on a determination at the computer system to assign an optional default value to a field in the first set of fields, defining a field map at the computer system for the field in the first set of fields where literal data associated with an optional default value in the set of default values is assigned to the first field without overriding a matching based on the set of required rules and literal data specified in the set of required default values;

based on a determination at the computer system that any fields in the first set of fields remain unassigned, assigning a null value at the computer system as the data for unassigned fields in the first set of fields; and automatically generating a data map at the computer system that maps data to the first set of fields based on field maps defined by the computer system;

wherein the data map is used by the computer system to service the request from the user interacting with the application to access data stored in a data repository.

* * * * *

UNITED STATES PATENT AND TRADEMARK OFFICE
CERTIFICATE OF CORRECTION

PATENT NO. : 7,596,573 B2  Page 1 of 1
APPLICATION NO. : 10/458972
DATED : September 29, 2009
INVENTOR(S) : Owen O'Neil et al.

It is certified that error appears in the above-identified patent and that said Letters Patent is hereby corrected as shown below:

Title page, Item (75) Inventors, in column 1, line 1, delete "Pleasanton, CA" and insert -- Hopkinton, MA --, therefor.

Title page, Item (75) Inventors, in column 1, line 2, delete "Pleasanton, CA" and insert -- Atwater, CA --, therefor.

Title page, (*) Notice: Delete "325 days" and insert -- 466 days --.

In column 14, line 32, in claim 1, delete "based at least" and insert -- based on at least --, therefor.

Signed and Sealed this

Twenty-fourth Day of August, 2010

David J. Kappos
*Director of the United States Patent and Trademark Office*